United States Patent [19]

Durand et al.

[11] 4,260,709

[45] Apr. 7, 1981

[54] MAGNESIUM-BASED CATALYST FOR USE IN THE POLYMERIZATION OF OLEFINS

[75] Inventors: Daniel C. Durand; Pierre M. F. Mangin, both of Martigues, France

[73] Assignee: Naphthachimie, Paris, France

[21] Appl. No.: 936,224

[22] Filed: Aug. 24, 1978

Related U.S. Application Data

[63] Continuation of Ser. No. 500,545, Aug. 26, 1974, abandoned, which is a continuation of Ser. No. 205,382, Dec. 6, 1971, abandoned.

[30] Foreign Application Priority Data

Dec. 4, 1970 [FR] France .................. 70 43628
Jun. 30, 1971 [FR] France .................. 71 23861

[51] Int. Cl.$^3$ .................. C08F 4/66; C08F 10/02
[52] U.S. Cl. .................. 526/137; 252/429 B; 252/429 C; 526/125; 526/142; 526/144; 526/151; 526/351; 526/352
[58] Field of Search .................. 252/429 B, 429 C; 526/144, 151, 137, 142

[56] References Cited

U.S. PATENT DOCUMENTS

| | | | |
|---|---|---|---|
| 2,927,105 | 3/1960 | Nienburg et al. | 526/144 |
| 2,954,367 | 9/1960 | Vandenberg | 526/151 |
| 3,101,328 | 8/1963 | Edmonds | 526/144 |
| 3,121,063 | 2/1964 | Tornquist | 526/151 |
| 3,299,026 | 1/1967 | Lang | 526/144 |

FOREIGN PATENT DOCUMENTS 2003075 7/1970 Fed. Rep. of Germany .......... 526/151

OTHER PUBLICATIONS

Rochow et al., The Chemistry of Organo Metallic Compounds, J. Wiley & Sons, N.Y. (1957) pp. 84–86.

*Primary Examiner*—Edward J. Smith

[57] ABSTRACT

This invention is addressed to catalysts for use in the polymerization of olefins comprising compounds of magnesium and one or more transition metals of groups IVa, Va and VIa, which are at least partially reduced, with the catalysts being prepared by reaction of magnesium, at least one mono-halogenated hydrocarbon and a compound of a transition metal having a valence of at least 4. The catalysts can be used for the polymerization of olefins, such as ethylene, in the low-pressure process.

16 Claims, No Drawings

MAGNESIUM-BASED CATALYST FOR USE IN THE POLYMERIZATION OF OLEFINS

This is a continuation of application Ser. No. 500,545, filed Aug. 26, 1974, now abandoned, which was in turn a continuation of Ser. No. 205,382, filed Dec. 6, 1971, now abandoned.

The invention relates to new catalysts which can be used for the polymerization of olefins, and a method of preparing such catalysts. The catalysts are particularly suitable for the polymerization or copolymerization of olefins having the formula $CH_2=CHR$, wherein R is a hydrogen atom or an alkyl radical having a maximum of 8 carbon atoms, for the preparation of polymers or copolymers having a molecular weight which is generally higher than 50,000. These catalysts are of particular interest in the polymerization or copolymerization of ethylene.

It is known in industry to polymerize olefins such as ethylene by means of a catalytic system comprising a trivalent titanium compound such as titanium trichloride, and an organoaluminic compound such as a trialkyl aluminum or an alkyl aluminum chloride. In these catalytic systems, titanium trichloride can be produced by reduction of titanium tetrachloride, for example by means of aluminum, at a fairly elevated temperature of the order of 200° C. The resulting compound substantially corresponds to the formula $TiCl_3$.

Although the catalytic systems produced in this way have interesting activity, they generally result in polymers at the end of the polymerization operation which contain more than 100 ppm of titanium which, for most uses of such polymers, makes it necessary in practice to remove the catalytic residues therefrom.

It has now been found that it is possible under certain conditions to reduce compounds of transition metals of subgroups IVa, Va and VIa of the periodic table of elements, by means of magnesium, at moderate temperatures, and thus to produce high-activity catalysts which make it unnecessary to remove the catalytic residues contained in the polymer.

The invention therefore relates to catalysts which can be used for the polymerization of olefins, said catalysts essentially comprising compounds of magnesium and metals which are at least partially reduced, selected from transition metals of subgroups IVa, Va and VIa of the periodic table of elements, said catalysts being prepared by the reaction of magnesium, monohalogenated hydrocarbons and halogenated and/or organic derivatives of said transition metals taken in a state of valency at least equal to four.

The transition metals of subgroups IVa, Va and VIA of the periodic table of elements, referred to in the preceding paragraph, comprise titanium, vanadium, chromium, zirconium, niobium, molybdenum, hafnium, tantalum, tungsten, thorium and uraniam.

The transition metal derivatives used preferably comprise compounds of tetravalent titanium, having the general formula $TiX_{4-m}(OR)_m$ in which X represents a halogen atom, generally chlorine, R represents an alkyl radical which can contain from 2 to 8 carbon atoms, and m is an integer or a fraction which can be of any value between 0 and 4.

The titanium compounds corresponding to this definition include, by way of example: titanium tetrachloride $TiCl_4$ or alkyl tetratitanates having the formula $Ti(OR)_4$. The compounds corresponding to the preceding formula in which m is different from 0 and 4, can be produced from calculated amounts of a titanium tetrahalide having the formula $TiX_4$, and an alkyl tetratitanate having the formula $Ti(OR)_4$, in accordance with a functional interchange reaction which can be written as follows:

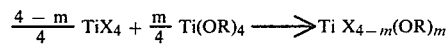

$$\frac{4-m}{4} TiX_4 + \frac{m}{4} Ti(OR)_4 \longrightarrow Ti X_{4-m}(OR)_m$$

The mono-halogenated hydrocarbons are preferably selected from chlorinated or brominated derivatives of saturated aliphatic hydrocarbons; they then correspond to the general formula $C_nH_{2n+1}Z$, in which formula Z represents a chlorine or a bromine atom and n is an integer up to 10, and preferably an integer from 1 to 8. Representative include alkyl halides, such as ethyl chloride, propyl chloride, pentyl bromide, etc. The mono-halogenated hydrocarbons can also be selected from cyclic derivatives (e.g. cyclopentyl chloride, cyclohexylchloride) or aromatic derivatives (e.g. chlorobenzene, benzyl chloride).

The magnesium preferably comprises magnesium of high purity and is used in the form of powder or turnings. In order to avoid the reaction requiring a long period of induction before beginning, which would considerably inconvenience the industrial production of the catalysts, the magnesium is reacted in an active form, that is to say in a form which is substantially free from impurities due especially to oxidation of the metal. In practice, the magnesium which is currently available in industry is activated before being introduced into the reaction medium, or within the medium itself. Preliminary activation of magnesium can be effected, for example, by grinding the metal in an inert atmosphere or within an inert liquid such as an aliphatic solvent; preliminary activation can also be effected by treating the magnesium by iodine vapor. It is more convenient, however, to activate the magnesium in the reaction medium, for example, by introducing into the medium catalytic amounts of substances such as iodine, alcoholates of metals of subgroups Ia, IIA and IIIa of the periodic table of elements, alkyl titanates, or etheroxides; the latter compounds can be selected from alkylane oxides such as ethylene oxide, propylene oxide, etc., or from cyclic ether-oxides, such as dioxan or tetrahydrofuran.

In order to obtain highly active catalysts, it is preferred to react amounts of reactants such that:

the ratio between the number of mono-halogenated hydrocarbon molecules and the number of magnesium atoms is between 0.5 and 10 and preferably between 2 and 4, the ratio between the number of transition metal compound molecules and the number of magnesium atoms is less than 0.5 and preferably less than 0.25.

When using ether oxides as magnesium activating agents, it is recommended to introduce the ether oxides into the reaction medium in amounts such that the ratio between the number of magnesium atoms is between 0.1 and 1 and preferably lower than 0.5.

Analysis of the catalysts shows that these products contain magnesium compounds which do not have any reducing power, and compounds of reduced transition metals, which in the case of titanium, are essentially in the trivalent state.

The composition of these catalysts can vary within fairly wide limits, according to the conditions under which they were prepared; in spite of these variations in their composition, it has been found that the activity of these catalysts remained in every case very high.

It has been noted, however that the value of the ratio between the number of mono-halogenated hydrocarbon molecules and the number of magnesium atoms has an influence on the composition of the catalyst produced. In fact, when this ratio is lower than a value which is approximately equal to 1.5, the resulting catalyst contains organic radicals resulting from the mono-halogenated hydrocarbon. When on the other hand this ratio is equal to or higher than a value of about 2, and when the transition metal derivative used is a halide, analysis of the catalyst obtained no longer discloses the presence of organic radicals.

It has also been noted that the value of the ratio between the number of transition metal compound molecules and the number of magnesium atoms influences the amount of the compound of the transition metal which is reduced during the reaction. Thus, when the transition metal compound is a compound of tetravalent titanium, it was noted that, in order to achieve complete reduction of the titanium compound to the trivalent state, the atomic ratio Ti/Mg should be lower than or equal to about $\frac{1}{3}$.

The catalysts according to the invention are advantageously prepared in inert solvents which constitute a heat reserve and thus regulate the reaction. Aliphatic hydrocarbons such as heptane or mixtures of hydrocarbons of petroleum origin are particularly suitable. The amount of inert solvent used can vary within wide limits; in practice, it is convenient to use amounts of inert solvents such that the reaction medium contains between 10 and 500 g of magnesium per liter.

Preparation of the catalysts of the invention can be effected using different modes of operation. Thus, for example, the different reactants can be introduced into an inert solvent at a temperature which is sufficiently low for the reaction not to be initiated: the reaction mixture is then heated with agitation, if necessary, after the addition of a magnesium activating agent such as an iodine crystal, then it is maintained at a sufficient temperature for the reaction to be maintained, generally at a temperature from $-20°$ to $150°$ C., for a period of a few minutes to a few hours.

In another embodiment, the various reactants, except for either the magnesium or for the mono-halogenated hydrocarbon, are introduced into the inert solvent; the reaction mixture being raised with agitation to a sufficient temperature for the reaction to be able to commence, the missing reactant is then progressively introduced and the reaction is carried out as before.

The catalysts according to the invention occur in the form of solid substances in finely divided form, which can be washed several times by solvents such as aliphatic hydrocarbons, until virtually all the compound dissolved in the washing solvents has disappeared. The resulting catalysts can be preserved in the dry condition or better, in suspension in the last charge of washing solvent.

It is important that the above described series of operations, which comprises the preparation and preservation of the catalysts, should be carried out in the absence of air and/or moisture.

The resulting catalysts can be used for the polymerization or the copolymerization of olefins, such as ethylene and/or olefins having the formula $CH_2=CHR$, wherein R represents an alkyl radical having from 1 to 8 carbon atoms. In this type of polymerization, the catalysts according to the invention are preferably associated with co-catalysts selected from organo-metallic compounds of the metals of groups II and III of the periodic table of elements, such as organo-aluminic compounds having the mean formula $AlR_nX_{3-n}$, wherein R represents hydrogen and/or an alkyl group having from 1 to 8 carbon atoms, X represents a halogen atom, preferably chlorine, and n is an integer or a fraction which can be of any value between 1 and 3. These co-catalysts are advantageously used in amounts such that the molecular ratio between metals of groups II and III of the co-catalysts and transition metals of subgroups IVA, Va and VIa of the catalysts, is between 1 and 50.

The catalysts according to the invention can be used in particular for the polymerization of olefins using the so called "low pressure" procedure, which generally comprises operating at a pressure lower than 20 bars and at a temperature between $40°$ and $150°$ C. Polymerization can be carried out in a liquid in which the catalyst is dispersed, which liquid can be the liquified monomer or a saturated aliphatic hydrocarbon; polymerization can also be effected in gaseous phase in the absence of any liquid diluent. In the course of polymerization, it is possible to act on the mean molecular weight of the polymer formed, by means of a chain limiting agent such as hydrogen in molecular proportions, with respect to the olefin to be polymerized, which are generally between 10 and 80%. Polymerization is stopped when the polymer reaches the desired mean molecular weight, which is most frequently between 50,000 and 1,000,000. Because of the high degree of activity of the catalysts of the invention, the polymers produced generally contain less than 100 ppm of transition metals, and they can be used for the required purpose without having to undergo any purification treatment.

EXAMPLE 1

(a) Preparation of the catalyst:

A 1-liter glass reaction vessel provided with a mechanical stirrer, a reflux condenser and a heating or cooling means is filled with dry nitrogen; the following are introduced successively, at ambient temperature:

12.15 g (500 m.mole) of magnesium in powder form
23.75 g (125 m.mole) of titanium tetrachloride
92.5 g (1 mole) of n-butyl chloride heptane, in order to supplement the volume of 600 ml.

After the addition of 1.26 g of iodine, the reaction medium is raised with agitation to $75°$, so as to initiate the reaction; the reaction begins slowly after about 1 hour and 30 minutes, and the reaction medium is maintained at $75°$ C. for 3 hours 30 minutes. The brown-black precipitate produced is washed a number of times with heptane; its composition by weight is as follows:

Ti: 10.3%; Mg: 19.2%; Cl: 70.5%

(b) Polymerization of ethylene:

2 liters of heptane are introduced under a nitrogen atmosphere at ambient temperature into a 5-liter stainless steel reaction vessel provided with a mechanical agitator. After heating the heptane to $70°$ C., the following are introduced:

0.46 g (4 m.mole) of triethylaluminum an amount of catalyst corresponding to one milligram-atom of titanium.

The reaction medium is heated to 75° C. and hydrogen is introduced until a pressure of 6 bars is produced, followed by ethylene at a flow rate of 160 g/h.

After 7 hours of polymerization, 1100 g of polymer is collected, the titanium content of which is 34 parts per million by weight (ppm); the apparent density of the polymer is 0.40 g/ccm; it has an index of fluidity under a load of 2.16 kg of 2.3.

EXAMPLE 2

Operation is as in Example 1, the amounts of certain reactants, however, being varied as specified in Table I.

The resulting catalyst is subjected to the same ethylene polymerization test as in Example 1. The amount of polymer obtained and the titanium content thereof are shown in Table I.

EXAMPLE 3

Operation is as in Example 1, although the amounts of certain reactants are varied as indicated in Table I.

In this case, the composition by weight of the catalyst obtained is as follows:

Ti=3.6% Mg=20.4% Cl=50.5% Organic residues=25.5%

The results obtained in polymerization are included in Table I.

EXAMPLE 4

(a) Preparation of the catalyst:

A 1-liter glass reaction vessel provided with a mechanical stirrer, a reflux condenser and a heating or cooling means is filled with dry nitrogen; the following are successively introduced at ambient temperature:
  12.15 g (500 m.moles) of magnesium in powder form
  23.75 g (125 m.moles) of titanium tetrachloride heptane, in order to supplement the volume to 600 ml.

After adding 1.26 g of iodine, the reaction medium is raised with agitation to 75° C. 115.6 g (1250 mole) of n-butyl chloride is then progressively introduced in one hour.

The reaction medium is kept with agitation at 75° C. for 6 hours.

The brown-black precipitate obtained is washed a number of times with heptane; its composition by weight is as follows:

Ti=9% Mg=18% Cl=73%

(b) Polymerization of ethylene:
Operation is as in Example 1(b).
The results obtained are shown in Table I.

EXAMPLE 5

Operation is as in Example 4, although the amounts of certain reactants are varied as indicated in Table I.

EXAMPLE 6

Operation is as in Example 1, except that magnesium in powder form which has first been subjected to crushing in a nitrogen atmosphere is used, and that no iodine is introduced into the reaction medium.

The catalyst obtained is subjected to the same polymerization test as in Example 1(b); the results obtained are shown in Table I.

EXAMPLE 7

Operation is as in Example 1, except that an equimolecular mixture of titanium tetrachloride and n-propyl titanate is used instead of titanium tetrachloride, and that no iodine is introduced.

The results obtained are shown in Table I.

EXAMPLE 8

Operation is as in Example 1, except that ethyl chloride is used instead of n-butyl chloride.

The results obtained are shown in Table I.

EXAMPLE 9

Operation is as in Example 1, except that vanadium tetrachloride is used instead of titanium tetrachloride.

The results obtained are shown in Table I.

EXAMPLE 10

2 liters of heptane are introduced at ambient temperature in a nitrogen atmosphere into a 5-liter stainless steel reaction vessel provided with a mechanical stirrer. After having heated the heptane to 60° C., the following are introduced:
  0.6 g (5 m.moles) of diethylaluminum chloride
  an amount of catalyst prepared as in Example 1, which corresponds to 2 milligram-atoms of titanium.

The reaction medium is maintained at 60° C. and hydrogen is introduced thereinto until a pressure of 0.5 bar is obtained, followed by propylene at a flow rate sufficient to maintain the pressure at 5.5 bars during the polymerization operation.

After 6 hours of polymerization, 550 g of polymer is collected.

EXAMPLE 11

(a) Preparation of the catalyst.

A 1-liter glass reaction vessel provided with a mechanical stirrer, a reflux condenser and a heating or cooling device is filled with dry nitrogen; the following are introduced successively at ambient temperature:
  12.15 g (0.5 mole) of powder magnesium an iodine crystal
  47.5 g (0.25 mole) of titanium tetrachloride
  28.5 g (0.25 mole) of ethylene oxide heptane, in order to supplement the volume to 500 ml.

After the mixture has been raised to a temperature of 75° C., 46.25 g (0.5 mole) of n-butyl chloride is progressively introduced thereinto in 1 hour. The reaction medium is kept at 75° C. with agitation for 6 hours.

The brown-black precipitate obtained is washed several times with heptane. The composition of the catalyst is as follows:

Ti=6.8%; Mg=28.8%; Cl=42.4%; Organic residue=32%

(b) Polymerization of ethylene.

The following are successively introduced into a 5-liter stainless steel reaction vessel:
  2 liters of heptane
  0.8 g (4 m.mole) of triisobutylaluminum
  an amount of catalyst which corresponds to 1 milliequivalent of titanium.

The reaction medium is heated to 75° C., and hydrogen is introduced thereinto until a pressure of 2 bars is reached, followed by ethylene at a flow rate of 120 g/h.

After 6.5 hours of polymerization, the polymer formed is isolated. The polymer weighs 770 g and its residual titanium content is 56 parts per million.

EXAMPLE 12

This example is given by way of comparison.

Operation is as in the preceding example, but without introducing any butyl chloride into the reaction medium. After 3 hours of reaction at 75° C., it is observed that no precipitate is formed. Analysis of the reaction medium shows that the titanium has remained in the tetravalent state.

EXAMPLES 13 TO 17

Operation is as in Example 11, although the amounts of certain reactants are varied as specified in Table II.

EXAMPLE 20

Operation is as in Example 11, except that ethyl chloride is used instead of n-butyl chloride.
The results obtained are shown in Table II.

EXAMPLE 21

Operation is as in Example 11, except that vanadium tetrachloride is used instead of titanium tetrachloride.
The results obtained are shown in Table II.

EXAMPLE 22

Operation is as in Example 11, except that an equimolecular mixture of titanium tetrachloride and n-propyl titanate is used instead of titanium tetrachloride.
The results obtained are shown in Table II.

TABLE I

| | Preparation of the catalyst | | | | Polymer | |
|---|---|---|---|---|---|---|
| Example | Mg (g-atoms) | Iodine | $TiCl_4$ (moles) | $C_4H_9Cl$ (moles) | weight (g) | Ti (ppm) |
| 1 | 0.5 | 1.26 | 0.125 | 1 | 1100 | 34 |
| 2 | 0.75 | 1.26 | 0.250 | 2 | 980 | 40 |
| 3 | 0.375 | 1.26 | 0.125 | 0.375 | 670 | 64 |
| 4 | 0.5 | 1.26 | 0.125 | 1.25 | 920 | 48 |
| 5 | 0.375 | 1.26 | 0.125 | 0.75 | 960 | 44 |
| 6 | 0.5 | 0 | 0.125 | 1 | 960 | 40 |
| 7 | 0.5 | 0 | ($TiCl_4$ = 0.0625, $Ti(OC_3H_7)_4$ = 0.0625) | 1 | 880 | 52 |
| 8 | 0.5 | 1.26 | 0.125 | $C_2H_5Cl$ = 1 | 640 | 70 |
| 9 | 0.5 | 1.26 | $VCl_4$ = 0.25 | 0.5 | 760 | V = 62 |

TABLE II

| | Preparation of the catalyst | | | | Polymer | |
|---|---|---|---|---|---|---|
| Example | Mg (g-atoms) | $TiCL_4$ (moles) | $(C_2H_5)_2O$ | $C_4H_9Cl$ (moles) | Weight (g) | Ti (ppm) |
| 11 | 0.5 | 0.25 | 0.25 | 0.5 | 770 | 56 |
| 12 | " | " | " | 0 | no catalyst formed | |
| 13 | " | " | 0.06 | 0.5 | 630 | 70 |
| 14 | " | " | 0.5 | " | 50 | — |
| 15 | " | " | 0.25 | 1 | 850 | 50 |
| 16 | " | " | " | 2 | 780 | 54 |
| 17 | " | 0.125 | " | 1 | 750 | 56 |
| 18 | " | 0.25 | " | 0.5 | 690 | 60 |
| 19 | " | " | " | " | 720 | 65 |
| 20 | " | " | " | $C_2H_5Cl$ = 0.5 | 760 | 58 |
| 21 | " | $VCl_4$ = 0.25 | " | 0.5 | 760 | V = 70 |
| 22 | " | ($TiCl_4$ = 0.125) ($Ti(OC_3H_7)_4$ = 0.125) | " | " | 780 | 60 |

The catalysts obtained are subjected to the same polymerization test; the amounts of polymer obtained and the titanium content thereof are specified in Table II.

EXAMPLE 18

Operation is as in Example 11, except that n-butyl chloride is introduced in a few seconds into the reaction medium at 75° C.
The results obtained are shown in Table II.

EXAMPLE 19

Operation is as in Example 11, except that n-butyl chloride is introduced at the same time as the other reactants, at ambient temperature, and then the mixture is raised to a temperature of 75° C.
The results obtained are shown in Table II.

We claim:

1. A catalyst for the polymerization of olefins consisting essentially of (1) the reaction product prepared by mixing together magnesium, an alkyl halide and a compound of a transition metal of Groups IVa, Va and VIa having a valence of at least 4 selected from the group consisting of halogenated, organic and organic-halogenated compounds of said transition metal at a temperature below the temperature at which a reaction is initiated, heating the mixture to a temperature within the range of −20° to 150° C. for a time sufficient to react the magnesium, the alkyl halide and the compound of the transition metal, and washing the product of the reaction with an aliphatic hydrocarbon, with the molar ratio of the transition metal to magnesium being less than 0.5 and the mole ratio of the alkyl halide to magnesium being within the range of 0.5 to 10 and (2) at least one organo metallic compound of a metal selected from the group consisting of the metals of Group II and Group III.

2. A catalyst as defined in claim 1 wherein the mole ratio of the monohalogenated hydrocarbon to magnesium is within the range of 2 to 4, and the mole ratio of the transition metal compound to magnesium is less than 0.25.

3. A catalyst as defined in claim 1 wherein the magnesium is activated prior to reaction by crushing the magnesium in an inert medium.

4. A catalyst as defined in claim 1 wherein the magnesium is activated prior to reaction by contacting the magnesium with a catalytic amount of a compound selected from the group consisting of iodine, alcoholates of a metal selected from the group consisting of a metal of Groups Ia, IIa and IIIa and alkyl titanates.

5. A catalyst for the polymerization of olefins consisting essentially of (1) the reaction product prepared by mixing together magnesium, an alkyl halide and a titanium compound having the formula $$TiX_{4-m}(OR)_m$$

wherein X is a halogen atom, R is alkyl and m is an integer or fraction from 0 to 4 at a temperature below the temperature at which a reaction is initiated, heating the mixture to a temperature from −20° to 150° C. for a time sufficient to react the magnesium, the alkyl halide and the titanium compound in the presence of an activator selected from the group consisting of iodine and ether oxides with the mole ratio of titanium to magnesium being less than 0.5 and the molar ratio of the alkyl halide to magnesium being within the range of 2 to 4, and washing the product of the reaction with an aliphatic hydrocarbon and (2) at least one organo-aluminum compound.

6. A catalyst as defined in claim 5 wherein the magnesium is activated with an ether-oxide, with the ether-oxide being introduced to the reaction mixture in a mole ratio of ether-oxide to magnesium within the range of 0.1 to 1, said ether-oxide being selected from the group consisting of alkylene oxides, dioxan or tetrahydrofuran.

7. A catalyst for the polymerization of olefins consisting essentially of (1) a reaction product of a compound of a transition metal of Groups IVa, Va and VIa having a valence of at least 4 selected from the group consisting of halogenated, organic and organic-halogenated compounds of said transition metal, magnesium and an alkyl halide, with said compound of transition metal and at least one of the alkyl halide and the magnesium being added to an inert solvent, with the other of the alkyl halide and the magnesium being added progressively to carry out the reaction of said compound of said transition metal, said magnesium and said alkyl halide, the molar ratio of the transition metal to the magnesium being less than 0.5 and the mole ratio of the alkyl halide to the magnesium being within the range of 0.5 to 10 and (2) at least one organo metallic compound of a metal selected from the group consisting of the metals of Group II and Group III.

8. A catalyst as defined in claim 7 wherein the magnesium is activated prior to reaction by contacting the magnesium with the catalytic amount of a compound selected from the group consisting of iodine, alcoholates of a metal selected from the group consisting of a metal of Groups Ia, IIa and IIIa and alkyl titanates.

9. A catalyst as defined in claim 7 wherein the magnesium is activated with an ether oxide, with the ether oxide being introduced to the reaction mixture in a mole ratio of ether-oxide to magnesium within the range of 0.1 to 1, said ether-oxide being selected from the group consisting of alkylene oxides, dioxane and tetrahydrofuran.

10. A catalyst as defined in claim 7 wherein said compound of said transition metal and said magnesium are added to the inert solvent, with the alkyl halide being added progressively over the reaction.

11. In the method for the polymerization of one or more olefins, the improvement comprising carrying out the polymerization reaction in the presence of a catalyst as defined in claim 7.

12. In a method for the polymerization of one or more olefins having the formula $$CH_2=CH-R$$

wherein R is hydrogen or alkyl containing 1 to 8 carbon atoms, the improvement comprising carrying out the polymerization in the presence of at least one organo-metallic compound of a metal selected from the group consisting of the metals of Groups II and III and the reaction product prepared by mixing together magnesium, an alkyl halide and a compound of a transition metal of Groups IVa, Va and VIa having a valence of at least 4 selected from the group consisting of halogenated, organic and organic-halogenated compounds of said transition metal at a temperature below the temperature at which a reaction is initiated, heating the mixture to a temperature within the range of −20° to 150° C. for a time sufficient to react the magnesium, the alkyl halide and the compound of the transition metal, and washing the product of the reaction with an aliphatic hydrocarbon with the molar ratio of the transition metal to magnesium being less than 0.5 and the molar ratio of the alkyl halide to magnesium being within the range of 0.5 to 10.

13. The method as defined in claim 12 wherein the organo-metallic compound is an organo-aluminum having the formula:

$$AlR_nX_{3-n}$$

wherein R is selected from the group consisting of hydrogen and alkyl, n is an integer or fraction within the range of 1 to 3 and X is halogen.

14. A method as defined in claim 13 wherein the transition metal compound is a titanium tetrahalide and the monohalogenated hydrocarbon is an alkyl halide.

15. In the method for the polymerization of one or more olefins having the formula:

$$CH_2=CH-R$$

wherein R is hydrogen or alkyl containing 1 to 8 carbon atoms, the improvement comprising carrying out the polymerization in the presence of at least one organo-aluminum compound and the reaction product prepared by mixing together magnesium, an alkyl halide and a titanium compound having the formula:

$$TiX_{4-m}(OR)_m$$

wherein X is a halogen atom, R is alkyl and m is an integer or fraction from 0 to 4 at a temperature below the temperature at which a reaction is initiated, heating the mixture to a temperature from −20° to 150° C. for a time sufficient to react magnesium, the alkyl halide and the titanium compound in the presence of an activator selected from the group consisting of iodine and ether oxides, with the molar ratio of titanium to magnesium being less than 0.5 and the molar ratio of the alkyl halide to magnesium being within the range of 2 to 4, and washing the product of the reaction with an aliphatic hydrocarbon.

16. A method as defined in claim 15 wherein the activator is selected from the group consisting of an alkylene oxide, dioxane and tetrahydrofuran.

* * * * *